United States Patent
Yoon

(10) Patent No.: US 8,411,127 B2
(45) Date of Patent: Apr. 2, 2013

(54) METHOD AND APPARATUS FOR CONNECTING VIDEO CALL IN DUAL STANDBY MOBILE COMMUNICATION TERMINAL

(75) Inventor: Yi-Ha Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 12/837,076

(22) Filed: Jul. 15, 2010

(65) Prior Publication Data

US 2011/0012987 A1 Jan. 20, 2011

(30) Foreign Application Priority Data

Jul. 20, 2009 (KR) .................. 10-2009-0065797

(51) Int. Cl.
*H04N 7/14* (2006.01)
(52) U.S. Cl. .................. 348/14.02; 348/14.01; 455/445; 455/558; 455/435.2
(58) Field of Classification Search .... 348/14.01–14.02, 348/14.08; 370/260–261; 709/204; 455/436, 455/445, 558, 422.1, 435.2
See application file for complete search history.

(56) References Cited

U.S. PATENT DOCUMENTS

| 2005/0064855 A1* | 3/2005 | Russell ......................... 455/417 |
| 2007/0207806 A1* | 9/2007 | Shaheen ....................... 455/436 |
| 2007/0238460 A1* | 10/2007 | Yamen .......................... 455/436 |
| 2008/0020773 A1* | 1/2008 | Black et al. .................... 455/445 |
| 2008/0064443 A1* | 3/2008 | Shin et al. ..................... 455/558 |
| 2009/0233600 A1* | 9/2009 | Johansson et al. .......... 455/435.2 |
| 2009/0239583 A1* | 9/2009 | Jheng ............................. 455/558 |

* cited by examiner

*Primary Examiner* — Melur Ramakrishnaiah
(74) *Attorney, Agent, or Firm* — Jefferson IP Law LLP

(57) ABSTRACT

A method and apparatus for video call connection in a dual standby mobile communication system are provided. A method for video call connection in a dual standby mobile communication terminal including a dual Subscriber Identity Module (SIM) card includes, when a paging signal requesting a video call is received from a network, identifying a system in which a first SIM card corresponding to the video call is camping, and, when the first SIM card is camping in a 2nd Generation (2G) system, identifying a system in which a second SIM card is camping, and, when the second SIM card is camping in a 3rd Generation (3G) system, requesting the network to forward the video call to the second SIM card.

18 Claims, 3 Drawing Sheets

METHOD AND APPARATUS FOR CONNECTING VIDEO CALL IN DUAL STANDBY MOBILE COMMUNICATION TERMINAL

PRIORITY

This application claims priority under 35 U.S.C. §119(a) to a Korean Patent Application in the Korean Intellectual Property Office on Jul. 20, 2009 and assigned Serial No. 10-2009-0065797, the entire disclosure of which is hereby incorporated by reference.

BACKGROUND OF THE INVENTION

1. Field of the Invention

The present invention relates to a method and apparatus for video call connection in a mobile communication terminal supporting dual standby. More particularly, the present invention relates to a method and apparatus for sharing a wireless access technology between a master and a slave to connect a video call in a dual standby mobile communication terminal.

2. Description of the Related Art

As the use of mobile communication increases and many network service providers come into existence, service goods of the respective network service providers are being diversified. This leads to an increase of the number of users using two networks. Users previously had to use two terminals so as to receive services from the two networks.

Due to this, mobile communication terminals supporting dual standby are being provided. Mobile communication terminals supporting dual standby generally include two Subscriber Identity Module (SIM) cards and allow users to receive services from two networks.

Because a mobile communication terminal supporting dual standby is equipped with two communication systems, the mobile communication terminal may receive services from different networks, respectively. But, the two communication systems do not share network resources with each other because the two communication systems are operated independently.

For example, where the two SIM cards installed in the dual standby mobile communication terminal both support a 3rd Generation (3G) system but only one of the SIM cards is camping in the 3G system and the other is camping in a 2nd Generation (2G) system, when a video call is generated for a phone number of the SIM card camping in the 2G system, the mobile communication terminal fails to receive the video call. In the conventional art, there is a problem in which, for the mobile communication terminal to connect the video call in the above circumstances, the mobile communication terminal has to either move to a 3G coverage area such that the other SIM card camps in the 3G system, or generate a video call for a phone number of the one SIM card camping in the 3G system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for connecting a video call in a mobile communication terminal supporting dual standby.

Another aspect of the present invention is to provide a method and apparatus for sharing a wireless access technology in use between a master and a slave to connect a video call in a mobile communication terminal supporting dual standby.

The above aspects are addressed by providing a method and apparatus for video call connection in a dual standby mobile communication system.

In accordance with an aspect of the present invention, a method for video call connection in a dual standby mobile communication terminal including a dual Subscriber Identity Module (SIM) card is provided. The method includes, when a paging signal requesting a video call is received from a network, identifying a system in which a first SIM card corresponding to the video call is camping, and, when the first SIM card is camping in a 2nd Generation (2G) system, identifying a system in which a second SIM card is camping, and, when the second SIM card is camping in a 3rd Generation (3G) system, requesting the network to forward the video call to the second SIM card.

In accordance with another aspect of the present invention, a method for connecting a video call in a network is provided. The method includes receiving a request for a video call connection for a specific phone number, transmitting a paging signal requesting the video call generation, to a receive Mobile Station (MS) corresponding to the specific phone number, receiving a request for forwarding the video call to a different phone number, from the receive MS, and transmitting the paging signal requesting the video call, to the MS corresponding to the requested phone number.

In accordance with a further aspect of the present invention, an apparatus for video call connection in a dual standby mobile communication terminal including a dual SIM card is provided. The apparatus includes a communication module and a controller. The communication module receives a paging signal requesting a video call, from a network. When a first SIM card corresponding to the video call is camping in a 2G system and a second SIM card is camping in a 3G system, the controller requests the network to forward the video call to the second SIM card.

In accordance with yet another aspect of the present invention, a network apparatus for connecting a video call of an MS is provided. When there is a request for a video call connection for a specific phone number, the apparatus transmits a paging signal requesting the video call to a receive MS corresponding to the specific phone number. When there is a request for forwarding the video call to a different phone number from the receive MS, the apparatus transmits the paging signal requesting the video call to the MS corresponding to the requested phone number.

In accordance with another aspect of the present invention, a wireless communication method is provided. The method includes receiving a signal requesting an incoming communication requiring a first wireless communication system, determining whether one of at least two SIM cards installed in a mobile terminal to which the communication is directed is camping in the first wireless communication system, when none of the SIM cards installed in the mobile terminal is camping in the first wireless communication system, informing a user that the communication cannot be completed, and when at least one of the SIM cards installed in the mobile terminal is camping in the first wireless communication system, requesting a forwarding of the communication to one of the SIM cards camping in the first wireless communication system.

In accordance with another aspect of the present invention, a mobile terminal is provided. The mobile terminal includes a master Subscriber Identity Module (SIM) card, a slave SIM card, a communication module for transmitting and receiving signals with respect to the master SIM card and the slave SIM card, and a controller for, when the communication module receives a request for a communication that requires a first wireless communication system, determining whether the master SIM card and/or the slave SIM card are camping in the first wireless communication system, and controlling the communication module based on the result of the determination, wherein, when the controller determines that the master SIM card is camping in the first wireless communication system, the controller controls the communication module to receive the communication via the master SIM card, and when the controller determines that the slave SIM card is camping in the first wireless communication system and the master SIM card is not camping in the first wireless communication system, the controller controls the communication module to transmit a forwarding request to forward the communication to the slave SIM card.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and apparatus for sharing a wireless access technology in use between a master and a slave to connect a video call in a mobile communication terminal supporting dual standby according to exemplary embodiments of the present invention are described below. Although the exemplary embodiments described below are directed toward connection of a video call, the concepts can be extended to any form of communication requiring a particular network.

Figure 1:
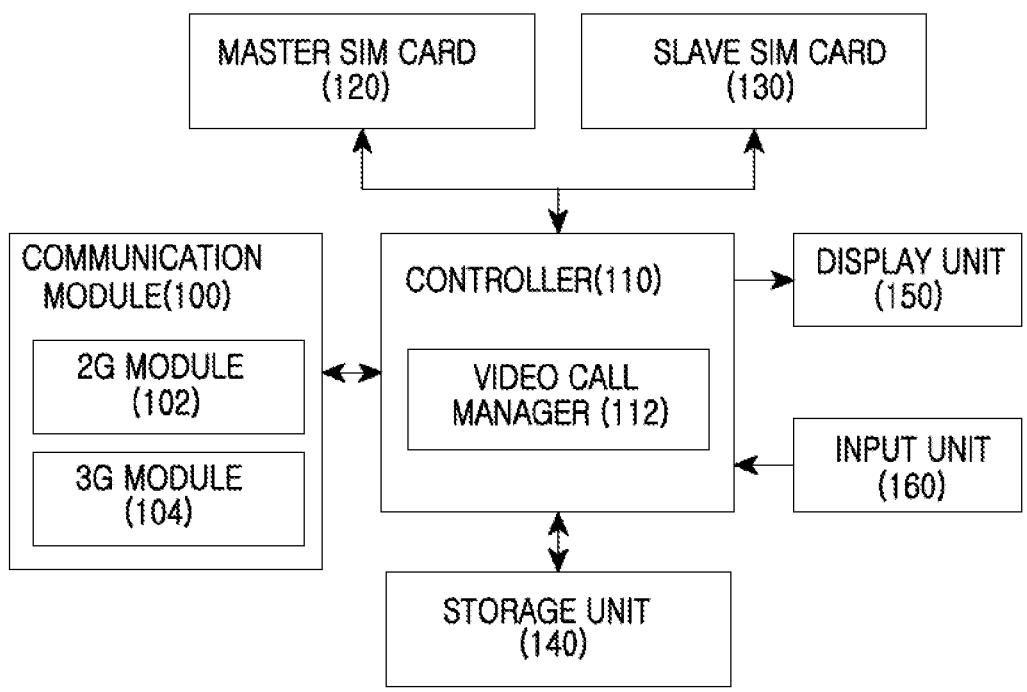
FIG. 1 is a block diagram illustrating a construction of a mobile communication terminal supporting dual standby according to an exemplary embodiment of the present invention.

FIG. 1 is a block diagram illustrating a construction of a mobile communication terminal supporting dual standby according to an exemplary embodiment of the present invention.

Referring to FIG. 1, the mobile communication terminal includes a communication module 100, a controller 110, a master Subscriber Identity Module (SIM) card 120, a slave SIM card 130, a storage unit 140, a display unit 150, and an input unit 160. The communication module 100 includes a 2nd Generation (2G) module 102 and a 3rd Generation (3G) module 104. The controller 110 includes a video call manager 112. The mobile communication terminal may also include additional units. Similarly, the functionality of two or more of the above units may be integrated into a single component.

The communication module 100 transmits/receives signals with Base Stations (BSs) of the 2G system and 3G system. The communication module 100 includes the 2G module 102 for transmitting/receiving and processing a signal for the 2G system, and the 3G module 104 for transmitting/receiving and processing a signal for the 3G system. The 2G module 102 and the 3G module 104 are each divided into a part operating with respect to the master SIM card 120 and a part operating with respect to the slave SIM card 130. The 2G module 102 and the 3G module 104 may allow the mobile communication terminal to simultaneously support the master SIM card 120 and the slave SIM card 130. For example, the 3G module 104 is divided into a part for the master SIM card 120 and a part for the slave SIM card 130. Thus, the 3G module 104 may transmit/receive and process only a signal for either the master SIM card 120 or the slave SIM card 130 or simultaneously transmit/receive and process signals for both the master SIM card 120 and the slave SIM card 130, under the control of the controller 110. The communication module 100 performs paging standby for the 2G systems and 3G systems of each of the master SIM card 120 and the slave SIM card 130 under the control of the controller 110 to make possible simultaneous standby for the 2G systems and 3G systems of each of the master SIM card 120 and the slave SIM card 130.

The controller 110 controls and processes a general operation of the mobile communication terminal. The controller 110 controls and processes a function for simultaneously supporting the master SIM card 120 and the slave SIM card 130. The controller 100 may include two separate processors so as to simultaneously support the master SIM card 120 and the slave SIM card 130. According to exemplary embodiments of the present invention, the controller 110 controls and processes a function for connecting the video call using the 3G system in which one SIM card is camping when a video call is generated for the other SIM card, where one SIM card is camping in a 2G system and the other SIM card is camping in a 3G system. When a video call for one SIM card camping in a 2G system is received, the controller 110 identifies a system in which the other SIM card is camping and, when it is identified that the other SIM card is camping in a 3G system, transmits a signal to a corresponding network requesting forwarding of the video call to the other SIM card. The controller 110 controls a function for connecting the video call through the 3G system in which the other SIM card is camping.

The master SIM card 120 and the slave SIM card 130 are detachable from the mobile communication terminal. The master SIM card 120 and slave SIM card 130 have their own microprocessors and memory chips and store various kinds of user information (e.g., a phone number). The master SIM card 120 and the slave SIM card 130 may support the same communication system. For example, the master SIM card 120 and the slave SIM card 130 may support a 3G system.

The storage unit 140 stores various kinds of programs and data for general operation of the mobile communication terminal.

The display unit 150 displays state information generated during operation of the mobile communication terminal, numerals, characters, still pictures, and moving pictures. Under the control of the video call manager 112, the display unit 150 may display a reception phone number for a currently received video call. The video call manager 112 may display whether a video call received by the mobile communication terminal is for any phone number that the mobile communication terminal supports.

The display unit 150 may be provided as a Liquid Crystal Display (LCD). In this case, the display unit 150 may include a controller for controlling the LCD, a video memory in which image data is stored and an LCD element. If the LCD is provided as a touch screen, the display unit 150 may perform a part or all of the functions of the input unit 160.

The input unit 160 includes a plurality of numeral keys, character keys, and function keys, and provides data corresponding to a key input by a user to the controller 110.

Figure 2:
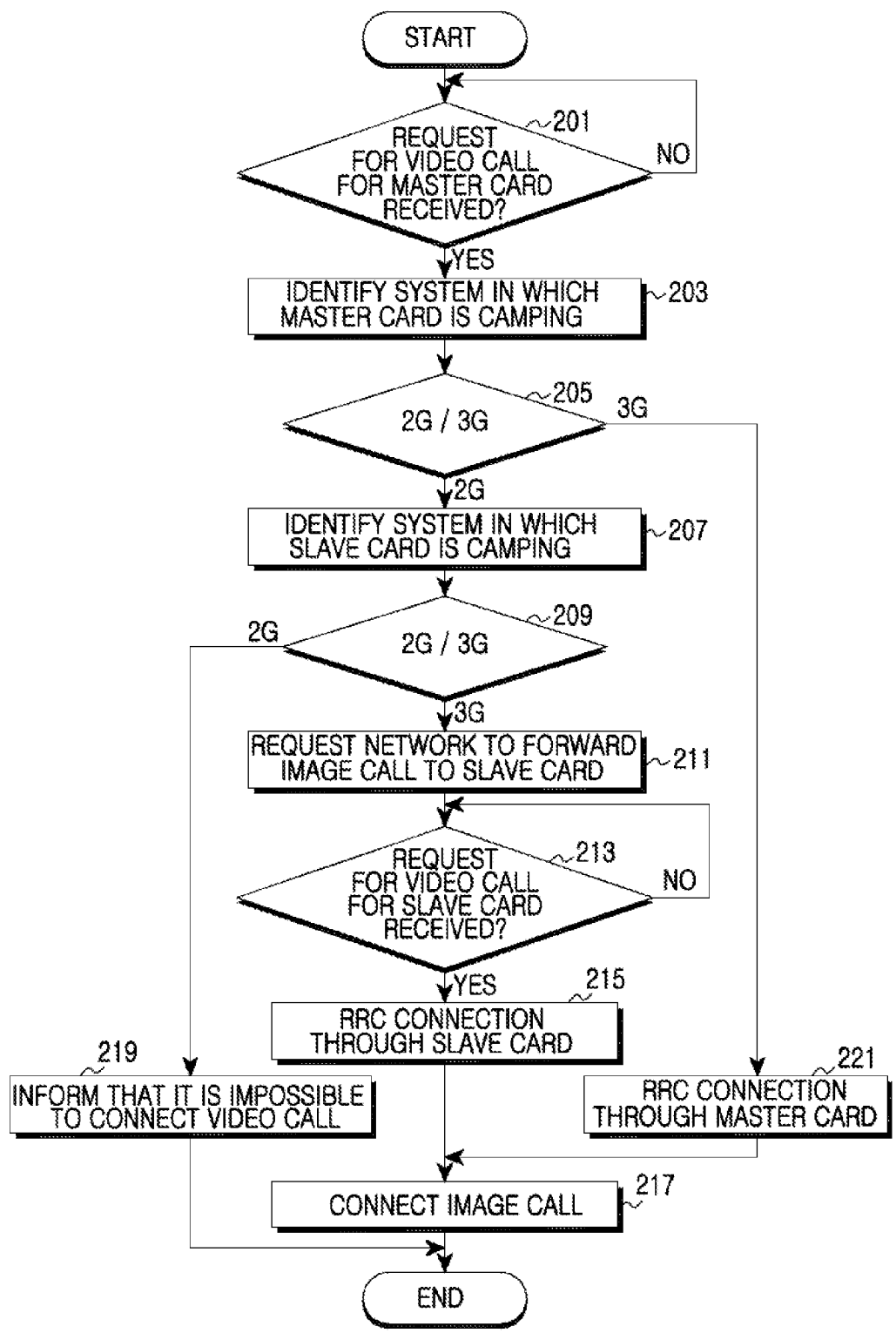
FIG. 2 is a flow diagram illustrating a procedure of establishing a video call in a mobile communication terminal supporting dual standby according to an exemplary embodiment of the present invention.

FIG. 2 illustrates a procedure of establishing a video call in a mobile communication terminal supporting dual standby according to an exemplary embodiment of the present invention. While the examples given below relate to a video call generated and received for a master SIM card, exemplary embodiments of the present invention are also applicable to a video call generated and received for a slave SIM card.

Referring to FIG. 2, when a paging signal requesting a video call for a master SIM card is received in step 201, the mobile communication terminal proceeds to step 203 and identifies a communication system in which the master SIM card is camping. In step 205, the mobile communication terminal determines if the communication system in which the master SIM card is camping is a 2G system or a 3G system. If the master SIM card is camping in the 3G system, the mobile communication terminal proceeds to step 221 and performs a procedure of Radio Resource Control (RRC) connection through the master SIM card and the 3G system in which the master SIM card is camping. The mobile communication terminal then proceeds to step 217 and connects the video call.

If the master SIM card is camping in the 2G system, the mobile communication terminal proceeds to step 207 and identifies a communication system in which a slave SIM card is camping. In step 209, the mobile communication terminal determines if the communication system in which the slave SIM card is camping is a 2G system or a 3G system. If the communication system in which the slave SIM card is camping is the 2G system, the mobile communication terminal proceeds to step 219 and informs a network or user that the video call cannot be connected. For example, the mobile communication terminal may display a message on a screen indicated that the video call cannot be connected because an accessible 3G system is not present.

If the communication system in which the slave SIM card is camping is the 3G system, the mobile communication terminal proceeds to step 211 and requests a corresponding network to forward the video call to the slave SIM card. The mobile communication terminal may transmit information (e.g., a phone number) of the slave SIM card to the network.

In step 213, the mobile communication terminal determines if a request for a video call for the slave SIM card received. If the video call for the slave SIM card is received, the mobile communication terminal proceeds to step 215 and performs the RRC connection procedure through the slave SIM card and the 3G system in which the slave SIM card is camping. The mobile communication terminal proceeds to step 217 and connects the video call through the 3G system in which the slave SIM card is camping.

Figure 3:
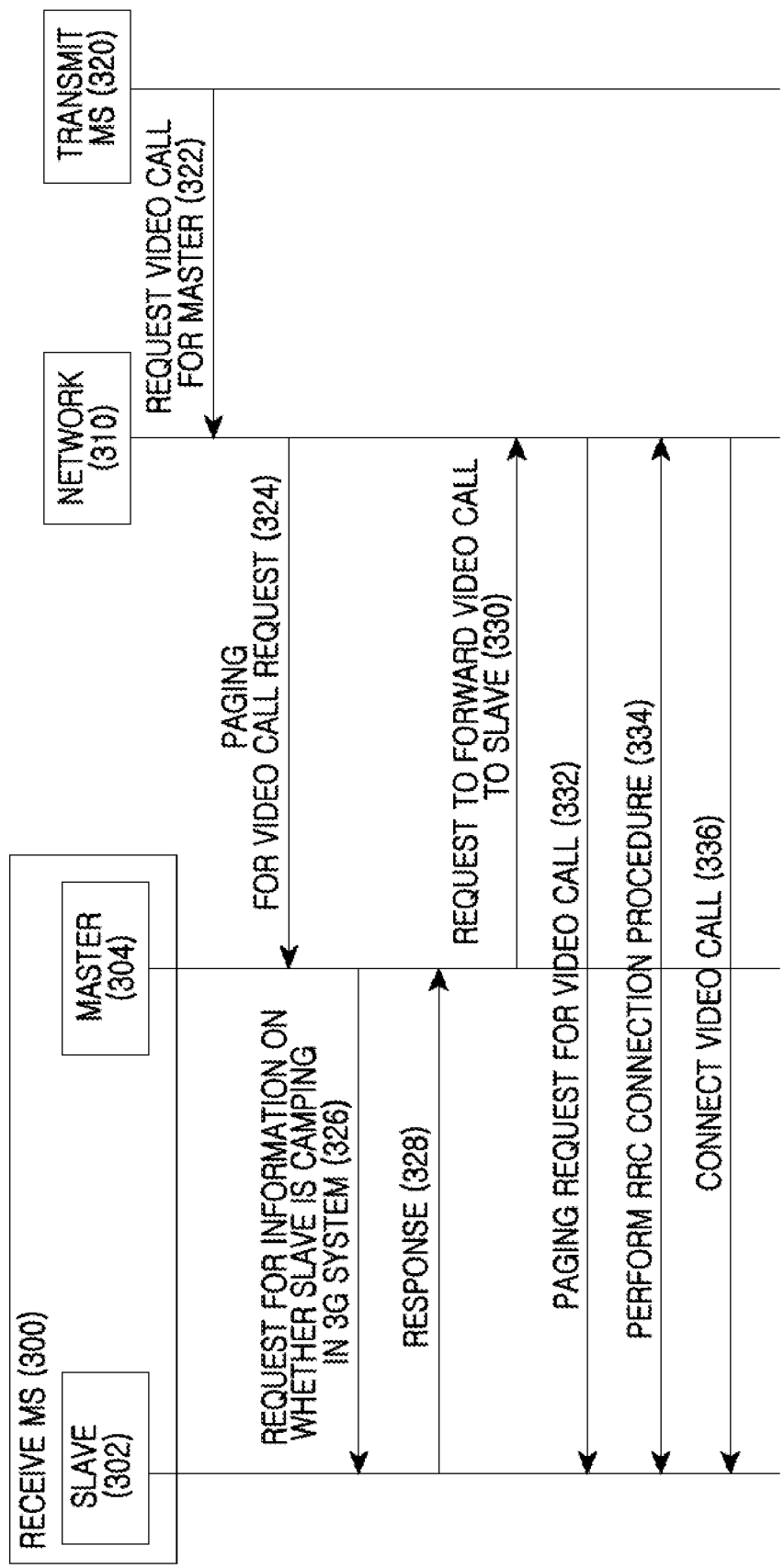
FIG. 3 is a ladder diagram illustrating a signal flow of establishing a video call in a mobile communication terminal supporting dual standby according to an exemplary embodiment of the present invention.

FIG. 3 illustrates a signal flow of establishing a video call in a mobile communication terminal supporting dual standby according to an exemplary embodiment of the present invention.

Referring to FIG. 3, a master denotes a processor for performing a telephony and general process for the master SIM card, and a slave denotes a processor for performing a telephony and general process for the slave SIM card. A receive MS is a dual standby mobile communication terminal according to an exemplary embodiment of the present invention, and a transmit MS is a mobile communication terminal enabling video telephony.

If the transmit MS 320 requests a video call for a phone number of a master SIM card of the receive MS 300 in step 322, a network 310 proceeds to step 324 and transmits a paging signal to a master 304 of the receive MS 300 requesting the video call for the master SIM card of the receive MS 300.

In step 326, the master 304 of the receive MS 300 receiving the paging signal transmits a signal to the slave 302 requesting whether the slave 302 is camping in a 3G system. In step 328, the slave 302 of the receive MS 300 receiving the paging signal transmits a response signal to the master 304 indicating that the slave 302 is camping in the 3G system. In step 330, the master 304, recognizing that the slave 302 is camping in the 3G system, transmits a signal to the network 310 requesting forwarding of the video call to the slave 302. The master 304 may transmit information (e.g., a phone number) of the slave 302 to the network 310.

In step 332, the network 310 transmits a paging signal to the slave 302 of the receive MS 300 requesting the video call. In step 334, the network 310 and the slave 302 of the receive MS 300 perform an RRC connection procedure for video call connection. In step 336, the network 310 connects the video call initiated by the transmit MS 320 with the slave 302 of the receive MS 300.

By sharing a radio access technology in use between a master and a slave to connect a video call in a mobile communication terminal supporting dual standby, a mobile communication terminal according to an exemplary embodiment of the present invention is capable of successfully receiving a video call or other communication, when only one of the master and the slave is camping in a 3G system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for video call connection in a mobile communication terminal comprising a dual Subscriber Identity Module (SIM) card, the method comprising:
   when a paging signal requesting a video call is received from a network, identifying a system in which a first SIM card corresponding to the video call is camping;
   when the first SIM card is camping in a 2nd Generation (2G) system, identifying a system in which a second SIM card is camping; and
   when the second SIM card is camping in a 3rd Generation (3G) system, requesting the network to forward the video call to the second SIM card.

2. The method of claim 1, further comprising, when the first SIM card is camping in a 3G system, connecting the video call through the 3G system in which the first SIM card is camping.

3. The method of claim 1, further comprising, when the second SIM card is also camping in the 2G system, informing a user that the video call cannot be connected.

4. The method of claim 1, wherein the requesting of the network to forward the video call to the second SIM card comprises transmitting a phone number of the second SIM card to the network.

5. A method for connecting a video call in a network, the method comprising:
   receiving a request for a video call connection for a specific phone number;
   transmitting a paging signal requesting the video call generation, to a receive Mobile Station (MS) corresponding to the specific phone number;
   receiving a request for forwarding the video call to a different phone number, from the receive MS; and
   transmitting the paging signal requesting the video call, to the MS corresponding to the different phone number.

6. An apparatus for video call connection in a mobile communication terminal comprising a dual Subscriber Identity Module (SIM) card, the apparatus comprising:
   a communication module for receiving a paging signal requesting a video call, from a network; and
   a controller for, when a first SIM card corresponding to the video call is camping in a 2nd Generation (2G) system and a second SIM card is camping in a 3rd Generation (3G) system, requesting the network to forward the video call to the second SIM card.

7. The apparatus of claim 6, wherein, when the first SIM card is camping in the 3G system, the controller controls to connect the video call through the 3G system to which the first SIM card is camping.

8. The apparatus of claim 6, wherein, when the second SIM card is camping in the 2G system, the controller informs a user that the video call cannot be connected.

9. The apparatus of claim 6, wherein, when requesting the network to forward the video call to the second SIM card, the controller transmits a phone number of the second SIM card to the network.

10. A network apparatus for connecting a video call of a Mobile Station (MS),
    wherein, when there is a request for a video call connection for a specific phone number, the apparatus transmits a paging signal requesting the video call to a receive MS corresponding to the specific phone number, and
    when there is a request for forwarding the video call to a different phone number from the receive MS, the apparatus transmits the paging signal requesting the video call to the MS corresponding to the different phone number.

11. A wireless communication method, comprising:
    receiving a signal requesting an incoming communication requiring a first wireless communication system;
    determining whether one of at least two SIM cards installed in a mobile terminal to which the communication is directed is camping in the first wireless communication system;
    when none of the SIM cards installed in the mobile terminal is camping the first wireless communication system, informing a user that the communication cannot be completed; and
    when at least one of the SIM cards installed in the mobile terminal is camping in the first wireless communication system, requesting a forwarding of the communication to one of the SIM cards camping in the first wireless communication system.

12. The method of claim 11, wherein the requesting of the forwarding comprises:
    when the mobile terminal includes a master SIM card and a slave SIM card, requesting the forwarding of the communication to the master SIM card when the master SIM card is camping in the first wireless communication system, and requesting the forwarding of the communication to the slave SIM card when the slave SIM card is camping in the first wireless communication system and the master SIM card is not camping in the first wireless communications system.

13. The method of claim 11, wherein the first wireless communication system is a 3rd Generation (3G) system.

14. The method of claim 11, wherein the communication is a video call.

15. A mobile terminal, comprising:
    a master Subscriber Identity Module (SIM) card;
    a slave SIM card;
    a communication module for transmitting and receiving signals with respect to the master SIM card and the slave SIM card; and
    a controller for, when the communication module receives a request for a communication that requires a first wireless communication system, determining whether the master SIM card and/or the slave SIM card are camping in the first wireless communication system, and controlling the communication module based on the result of the determination,
    wherein, when the controller determines that the master SIM card is camping in the first wireless communication system, the controller controls the communication module to receive the communication via the master SIM card, and when the controller determines that the slave SIM card is camping in the first wireless communication system and the master SIM card is not camping in the first wireless communication system, the controller controls the communication module to transmit a forwarding request to forward the communication to the slave SIM card.

16. The mobile terminal of claim 15, wherein, when the controller determines that neither the master SIM card nor the slave SIM card is camping in the first wireless communication system, the controller informs a user of the mobile terminal that the communication cannot be performed.

17. The mobile terminal of claim 15, wherein the first wireless communication system is a 3rd Generation (3G) system.

18. The mobile terminal of claim 15, wherein the communication is a video call.

* * * * *